United States Patent [19]

Schwartz

[11] Patent Number: 4,468,729
[45] Date of Patent: Aug. 28, 1984

[54] AUTOMATIC MEMORY MODULE ADDRESS ASSIGNMENT SYSTEM FOR AVAILABLE MEMORY MODULES

[75] Inventor: Albert H. Schwartz, St. Paul, Minn.

[73] Assignee: Sperry Corporation, New York, N.Y.

[21] Appl. No.: 278,600

[22] Filed: Jun. 29, 1981

[51] Int. Cl.³ .................. G06F 13/06; G11C 5/06; G11C 7/00
[52] U.S. Cl. .................................................. 364/200
[58] Field of Search ... 364/200 MS File, 900 MS File; 371/57

[56] References Cited

U.S. PATENT DOCUMENTS

| | | | |
|---|---|---|---|
| 3,742,458 | 6/1973 | Inoue et al. | 364/200 |
| 3,803,560 | 4/1974 | De Voy et al. | 364/200 |
| 3,805,250 | 4/1974 | Rich | 364/200 |
| 3,805,251 | 4/1974 | Morris et al. | 364/200 |
| 3,810,109 | 5/1974 | Morris et al. | 364/200 |
| 3,812,466 | 5/1974 | Rich | 364/200 |
| 3,839,706 | 10/1974 | Borchsenius | 364/200 |
| 3,860,908 | 1/1975 | Stratton | 371/57 |
| 4,025,903 | 5/1977 | Kaufman et al. | 364/200 |
| 4,031,517 | 6/1977 | Hirtle | 364/200 |
| 4,112,502 | 9/1978 | Scheuneman | 364/900 |
| 4,183,090 | 1/1980 | Furukawa et al. | 364/900 |
| 4,214,304 | 7/1980 | Shimizu et al. | 364/200 |

Primary Examiner—Gareth D. Shaw
Assistant Examiner—Daniel K. Dorsey
Attorney, Agent, or Firm—Charles A. Johnson; Kenneth T. Grace; Marshall M. Truex

[57] ABSTRACT

An automatic Memory Module sensing and Memory Module address assignment system during an initializing sequence is described. Each Memory Module has a memory assignment register associated therewith, and all memory assignment registers are initialized to an illegal Memory Module address. The interlock and switch signals are sequentially evaluated under control of a scan counter and decoder. A memory assignment counter is utilized to develop sequential Memory Module addresses and is advanced for each Memory Module found to exist in the system. The memory assignment register for the Memory Module under consideration is set to the address specified in the memory assignment counter if the Memory Module is determined to be present, or is left storing the illegal code if the Memory Module being considered is not present in the system or is switched off. A memory capacity counter is advanced for each Memory Module found to exist in the system, and upon completion of the initializing sequence, provides signals indicative of the total Memory Module capacity of the system. In the event no memory is available, a signal indicating that status is provided to the data processing system. Upon completion of the evaluation of all Memory Modules in the system, the automatic memory assignment sequence is terminated and memory accessing can commence, with Memory Modules being accessed by comparison of applied Memory Module address signals to the contents of the memory assignment registers. Mode selection provides alternatively for assignment of Memory Module addresses sequentially for individual Memory Modules in the Normal Mode, or for pairs of Memory Modules in the Page Mode.

17 Claims, 11 Drawing Figures

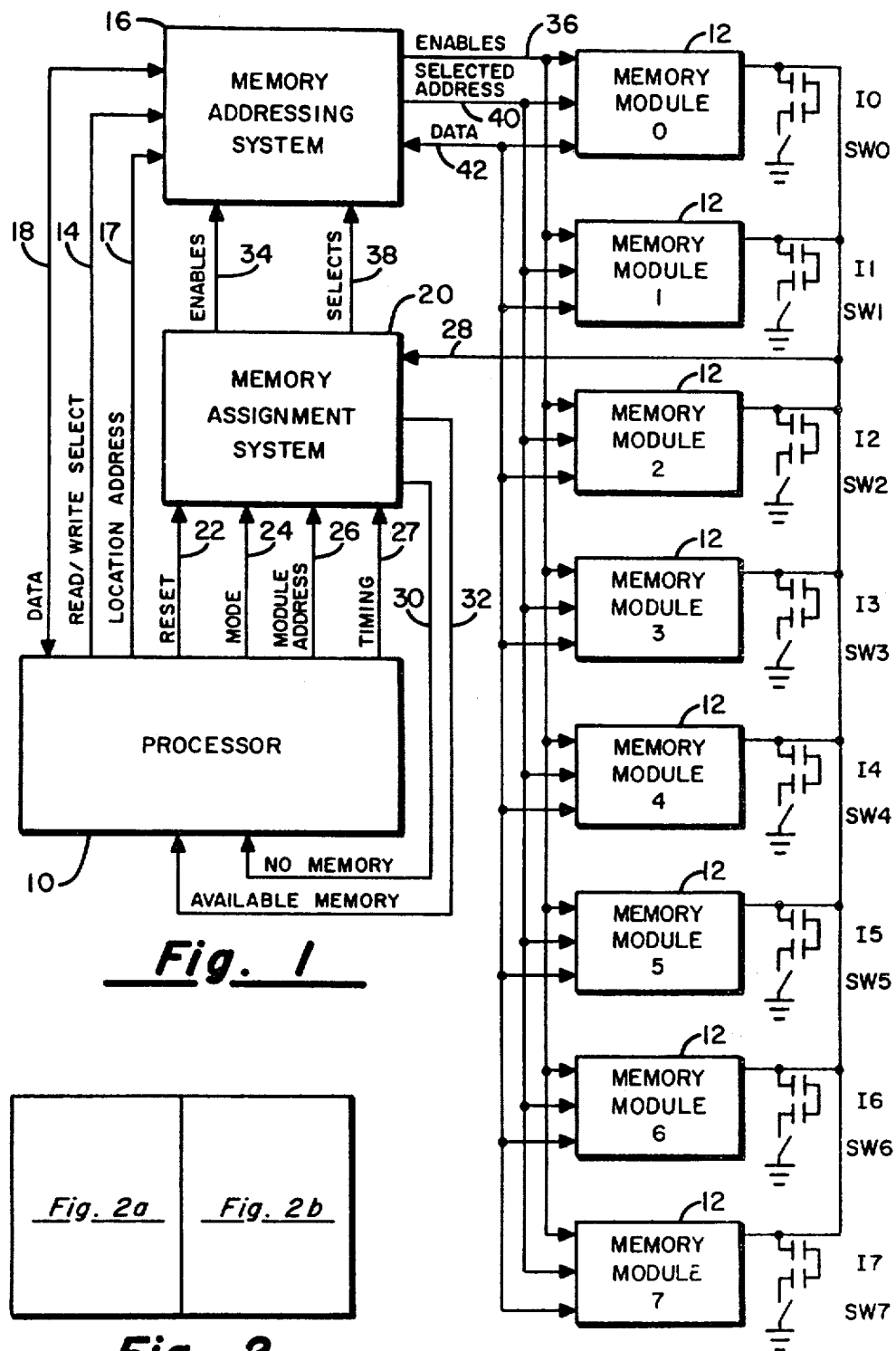

MEMORY ASSIGNMENT REGISTER TIMING

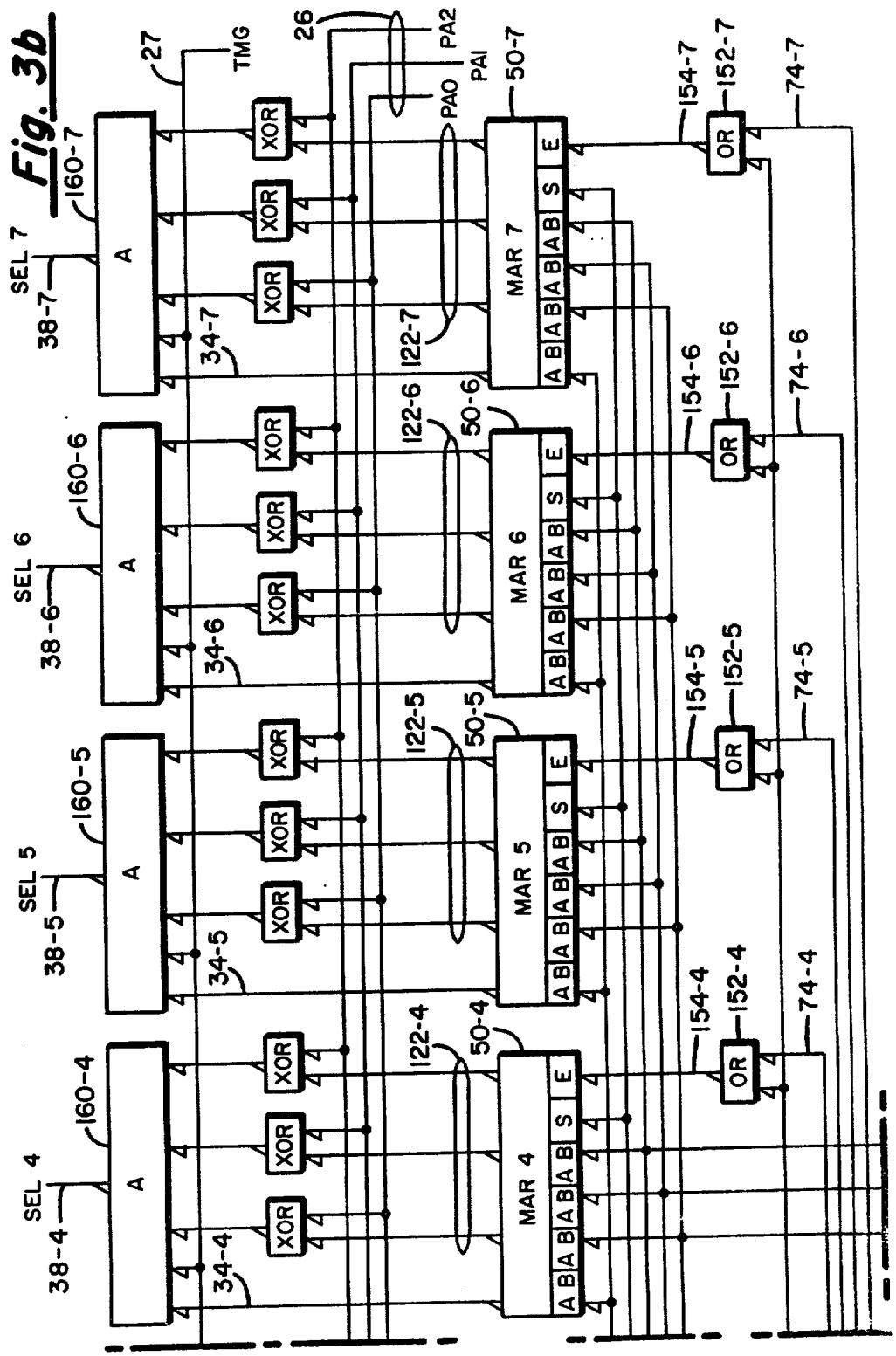

AUTOMATIC MEMORY MODULE ADDRESS ASSIGNMENT SYSTEM FOR AVAILABLE MEMORY MODULES

BACKGROUND OF THE INVENTION

This invention relates to data processing systems which include computing devices, and addressable memory systems that utilize a plurality of memory modules. More particularly, it relates to a data processing system that utilizes an addressable memory system comprised of a plurality of physically discrete memory modules, one or more of which may be absent from the system at any, particular time. Further it relates to a memory address assignment system that automatically assigns sequential module addresses to available modules available in the physical array, thereby bypassing missing memory modules in the addressing system.

In data processing systems it has long been recognized that it is desirable to provide large capacity memory systems arranged for storing and reading data from addressable locations. It is common to physically construct the memory systems in discrete modules that are alternatively referred to as arrays, panels, and the like. In binary systems it is common for each module to be physically constructed to accommodate a predetermined number of addressable locations. These arrangements are such that in the total addressing sequence, there is a portion of the address that designates the module and another portion of the address that designates the specific memory location within the module. For example, a memory module that is arranged to store 4,096 addressable locations can be addressed discretely to each addressable location by an octal address range from 0000 through 7777, thereby yielding octal 10000 sequential addresses. As is well known, this readily translates to binary discrete addressing. If a system capacity larger than a single module is desired, it is necessary only to add addressing designations that select additional modules discretely in addition to the specific addressing within the module.

In a memory system utilizing a plurality of modules, it is well known to provide a physical structure that provides for the mechanical support of each of the modules, together with electrical interconnection that provides power for each of the modules, and circuit interconnections that permit accessing each of the memory modules. In prior art systems, it was common for the physical location of a memory module to provide a part of the addressing selection within the system. The arrangements were such that the physical location afforded a position in the sequential addressing system that related to multiples of the module capacity. For example, a first module position would relate to the lowest ordered sequence of addresses that would extend from 0 through the capacity of the module. Once the sequential addressing extended beyond the capacity of first module, there would be automatic switching to the next physical location where sequential addressing would continue through the capacity of the second module. This sequential addressing would then continue through the number of modules available in the system. Systems of this type were firmly arranged for sequential addressing. Where a portion of the addressing was dependent upon physical location, it led to the problem of addressing gaps in the event a particular module or modules were inoperative for any reason. In other words, an inoperative or absent module in such a system would provide a gap of addressable locations equal to the capacity of the missing module. Since programs are characteristically generated and operate with the concept of available sequential addressing, complex procedures would be required to accommodate missing modules. Modules can be missing from the system because they are physically removed for maintenance, inspection, or repair, or can be physically present but switched out of the system because they have been found to be subject to malfunction. It can be seen, then, that systems designed to utilize sequentially addressable memory locations can be effectively rendered inoperable if one of the memory modules is removed or switched off for malfunction unless a procedure is provided that allows for the degraded system operation by re-assigning the effective sequencing of those memory modules that are available.

SUMMARY OF THE INVENTION

With the foregoing Background of the Invention in mind, this invention provides an automatic system for evaluation of available memory modules and assignment of addressing significance to those memory modules that are available. The system contemplates the use of interlock signals generated when a memory module is physically installed in the system, together with switching signals indicative that the memory module is operable within the system. At start-up or reset of the data processing system, an initializing sequence of the subject invention evaluates available memory modules and assigns addressing significance for each available memory module before initializing storage of programs and data. An indication is also provided as to the number of available memory modules to permit the system to ascertain whether available memory is adequate for the operational programs to function.

The interlock and switch circuits provide control information to a multiplexer that allows the sequential determination of which, if any, of the memory modules are available for address assignment. As previously mentioned, the subject invention involves a set-up sequence of memory module address assignment that occurs when power is turned on to the data processing system, or in response to a reset condition. It is not intended to be functional during operational programs as a programmable memory assignment or partitioning system. Further, once the automatic memory assignment is made, the addressing system does not evaluate memory module malfunction for performing reassignment. This would be accomplished by circuitry external to the automatic memory assignment system, and would require interruption of program operation, establishing a reset condition, and performing an automatic memory assignment after the faulty memory module is removed or switched out of the system.

The automatic memory assignment address system utilizes a controlled timing device that is capable of providing clock pulses at known intervals and which is initiated in operation by the advent of the occurance of a reset signal. The timing device continues to cycle and provide clock pulses until sufficient cycles have occurred to evaluate sequentially the availability of each memory module in the data processing system. When all memory modules have been evaluated for assignment in the memory addressing system, the timing device is disabled and the data processing system can proceed in operation. The system utilizes a Memory Assignment Register in conjunction with each available memory module in the system. At initialization, each Memory Assignment Register is set to a value that is an illegal address code. That is, a value is selected that will not compare to any permissible signal combination for selecting an available memory module. A Scan Counter is utilized in conjunction with the timing circuit to provide signals for discretely selecting in sequence each of the memory modules, and control the operation of a Decoder that sequentially selects the Memory Assignment Registers for setting.

A Memory Assignment Counter is initialized to reflect the address of a first memory module, and is advanced for each memory module that is found to exist in the system. The Memory Assignment Counter has its address count applied to all Memory Assignment Registers, and the one selected by the Decoder will result in the then current memory module address being established in the selected Memory Assignment Register. The Memory Assignment Counter is only advanced during a particular clock cycle if the associated memory module is available. Accordingly, sequential memory module addresses will be applied to those memory modules that are available in the system.

A Memory Capacity Counter is also utilized to count the number of memory modules found to be available in the system, and to provide output signals indicative of that number of memory modules. These signals can be utilized for operational programs to determine the memory capacity available for addressing and execution.

In actual addressing operation, then, it will be seen that those Memory Assignment Registers that are associated with memory modules that are present and functional in the system will have permissible memory module addresses associates with them. Those Memory Assignment Registers associated with memory module positions that are removed from the system or switched out of the system will be loaded with the illegal address configuration.

A Comparison circuit is associated with each Memory Assignment Register. The memory module portion of the data word address is applied to all of the Comparison circuits. When comparison between the memory module address set in one of the Memory Assignment Registers is found to compare with the memory address requested, an enable signal will be provided to that selected memory module.

It can be seen, then, that the automatic memory assignment system functions to assign sequential memory module addresses to those memory modules that are available and functional in the system, and will bypass any and all memory modules that are physically removed from the system or switched out of the system.

OBJECTS

A primary object, then, of the invention is to provide an automatic memory assignment system that will provide continuous memory addressing around physical gaps in the memory system resulting from missing or switched off memory modules.

Another object of this invention is to provide an indication to the data processing system when no memory is available.

Yet a further object of this invention is to provide an indication to the data processing system of the amount of functioning memory that is available.

Still a further object of this invention is to utilize counters under control of a timing circuit during an initializing scan sequence to count the number of memory modules available to the data processing system when power is initially applied or in response to a reset condition.

Yet another object of this invention is to utilize Memory Assignment Registers to store discrete memory module addresses for those memory modules available in the system and to store illegal or disabling memory module addresses when the associated memory module is absent or switched out of the operation in the data processing system.

These and other more detailed and specific objects and objectives will become apparent from a consideration of the following detailed description of the preferred embodiment of the invention together with the drawings.

BRIEF DESCRIPTION OF THE DRAWINGS

FIG. 1 is a block diagram illustrating a data processing system incorporating the automatic memory address assignment system in conjunction with a memory addressing system for a plurality of memory modules;

DETAILED DESCRIPTION OF THE PREFERRED EMBODIMENT

Figure 2A:
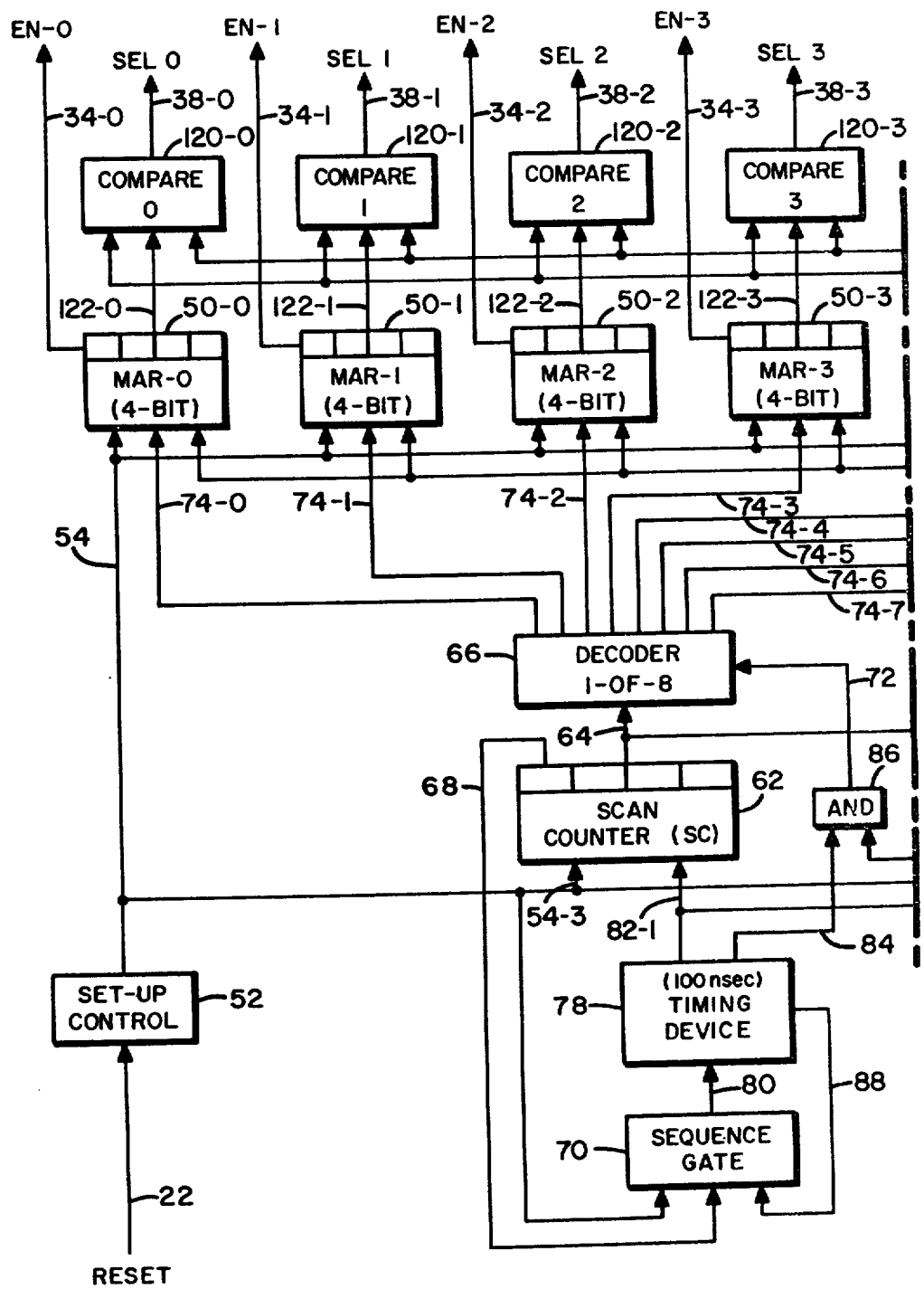
FIG. 2a and FIG. 2b, when arranged as shown in FIG. 2, is a block diagram of the automatic memory address assignment system.

FIG. 1 is a block diagram illustrating a data processing system incorporating the automatic memory address assignment system and memory addressing system for a plurality of memory modules. It utilizes a Processor 10 for performing the data processing operations, and controlling transfers of data to and from the overall memory system. The Processor can be any processor of the types available in the prior art that execute instructions and provide addresses to access memory. The system includes a plurality of Memory Modules 12, each of which is capable of storing data at addressable locations. Each Memory Module can be selected from memory devices available commercially, and may be internally addressable to discrete data words, to blocks of data words, segments of data words, or the like. The addressing of specific data does not form a part of the invention, it being understood that the invention is directed to evaluation of available Memory Modules and assigning of addressing information to those Memory Modules that are present.

After memory address assignment, which will be described in detail, the Processor provides either a Read or Write selection on line 14 to the Memory Addressing System 16. The Location Address of the data to be accessed is provided on line 17. The Location Address specifies the address within a Memory Module of the specific data that is to be either read or written. The data is transmitted on line 18 either to or from the Processor depending upon whether it is a Read or a Write function.

The Memory Assignment System 20 receives a Reset signal on line 22. The Mode selection signal is provided on line 24 and defines the selection of whether the Memory Modules are to be accessed in a Normal Mode or in a Page Mode. The distinction, as will be described in more detail below, results in a determination of whether or not a single Memory Modules or double Memory Modules will be required. Normal Mode utilizes a single Memory Module and the Page Mode requires availability of Memory Modules in pairs. The Memory Module address for a Read or Write operation is provided on line 26 and comprises a bit configuration that defines the Memory Module that is to be accessed.

The Memory Assignment System 20 responds to the Reset pulse received on line 22 for performing the initializing sequence that automatically assigns the Memory Module addresses in a predetermined order. The availability of a Memory Module is determined by the Memory Assignment System 20 sequentially evaluating the status of the Interlocks, labeled I0 through I7, and the Memory Switches, labeled SW0 through SW7, as provided on line 28.

In the embodiment shown, there are 8 Memory Modules which can be expressed in discrete addresses of 3 bits. The operation of the Memory Assignment System will be described in more detail below. As illustrated, all of the Interlock connections are open and all of the Switch contacts are open. Such an arrangement would indicate that there is no memory available, and a signal to that effect would be provided to the Processor on line 30. Those Memory Modules that would be physically inserted, thereby closing the Interlock connection, would be subject then to the selection of the associated Switches. As the Memory Modules are evaluated as to whether or not they are in the system, a count is kept as to the number of Memory Modules present. When the initializing sequence is completed, signals will be provided from the Memory Assignment System on line 32 to the Processor indicating the number of Memory Modules available.

When the Memory Modules have all been evaluated and automatically assigned a module address, those Memory Modules that are present in the system will be provided with Enable signals from the Memory Assignment System on line 34 through the Memory Addressing System 16. These Enable signals are provided on line 36 to those Memory Modules that are available in the system.

After the completion of the automatic memory assignment, the Processor can select data for accessing. A part of the selection is the specification of the Module Address on line 26, which is evaluated by the Memory Assignment System 20 to determine if that address has been assigned. This is accomplished by comparison of the applied Module Address to all of the assigned module addresses. When comparison is found, Timing signals will be provided on line 27, and a Select signal will be generated on line 38, which in combination with the Location Address received on line 17, specifically references the addressed Memory Module and the selected address on line 40. For a Write operation, the data passes from the Processor on line 18 through the Memory Addressing System out on line 42 to the selected Memory Module and the designated writing location. For a Read operation, the accessed Memory Module and the location addressed therein is read out and the data passes on line 42 to the Memory Addressing System and out on line 18 to the Processor. Having described the environment in which the invention operates, a detailed description of the functioning of the Memory Assignment System will be set forth below.

Figure 2B:
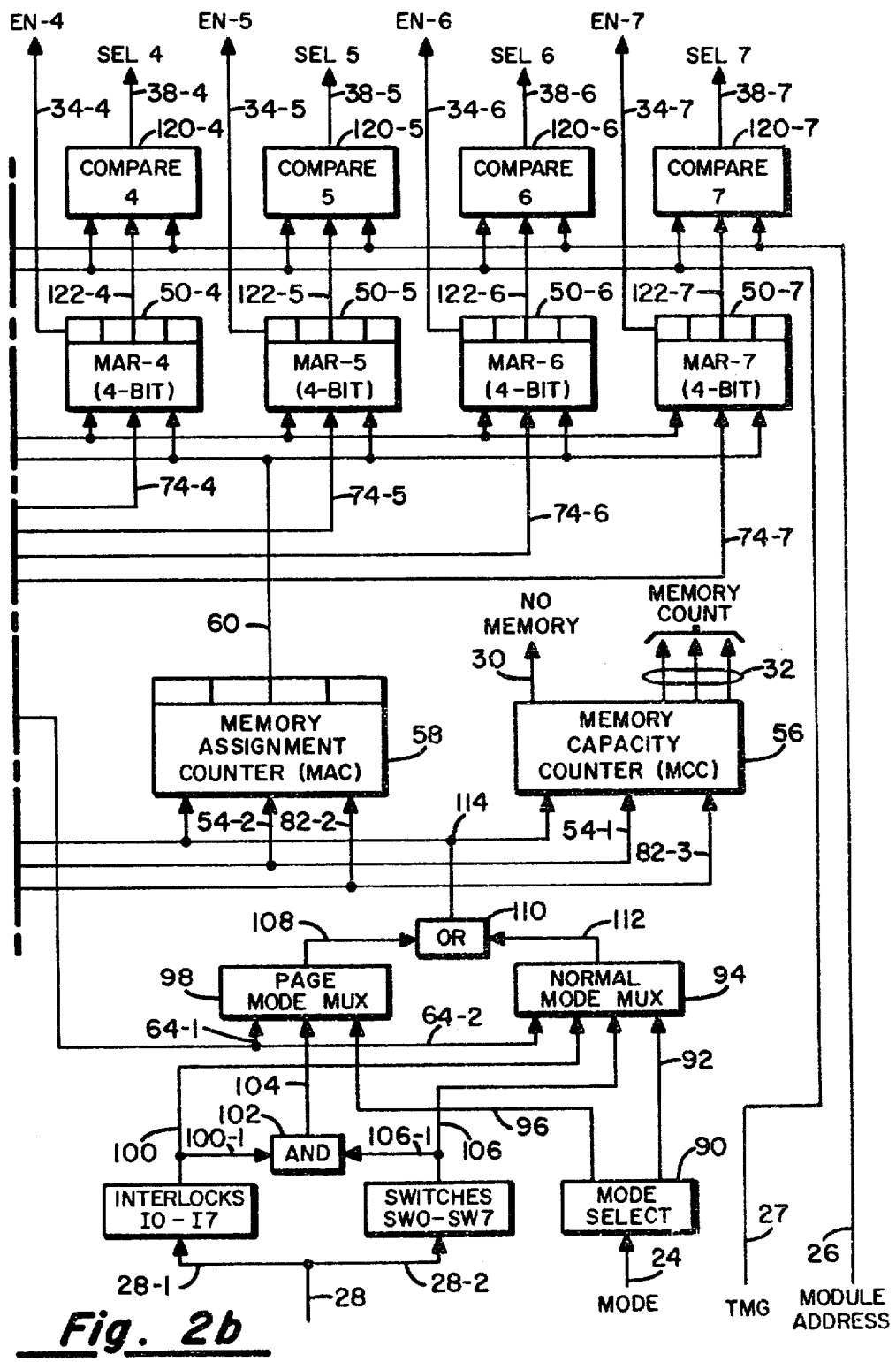

FIG. 2a and FIG. 2b, when arranged as shown in FIG. 2, is a block diagram of the automatic memory address assignment system of the present invention, and illustrates in block diagram form the circuitry. illustrated as the Memory Assignment System 20 in FIG. 1. For the embodiment illustrated, it assumes that there are 8 Memory Modules which are to be discretely addressed by 3 binary digits. In the block diagram, the blocks identify the functional units, and the arrowhead designation indicates the direction of information or control flow. The block diagram will treat the system on a functional basis and will not trace logic levels. A detailed discussion of the control and logic function will be set forth below.

There are eight Memory Assignment Registers, hereinafter referred to as MAR, labeled 50-0 sequentially through 50-7. Each MAR is comprised of 4 bit positions and is associated with a Memory Module. For example MAR-0 is associated with the 0 position Memory Module, and when the 0 position Memory Module is present, will control addressing access to it.

The Set-up Control 52 controls initialization of the circuitry in response to a Reset pulse received on line 22. Upon the occurance of the Reset pulse, a control signal on line 54 causes all MAR to be set to the illegal address code 1000. Having been thus initiated to an illegal code, it is then determined by an evaluation of the Memory Modules that are present which MAR designations will be changed to legal address codes permitting access to the associated Memory Modules.

The Memory Capacity Counter, hereinafter referred to as MCC, 56 is a 4-bit counter that responds to a determination of availability of a Memory Module to advance the count. Upon completion of the automatic memory assignment sequence, the MCC will provide signals on line 32 indicative of the number of Memory Modules present in the system, and if no Memory Modules are present, a signal will be provided on line 30 indicative that no memory is available. The MCC is initialized by a signal on line 54-1 to an initial condition of all 1's.

The Memory Assignment Counter, hereinafter referred to as MAC, 58, is initialized by a signal on line 54-2 to an all 0 condition. The MAC is the source of Memory Module address values that will be set in selectively enabled ones of the MAR from the signals provided on line 60.

The Scan Counter, hereinafter referred to as SC, 62 is a 4-bit counter that is initialized by a signal received on line 54-3 to store an all 0 bit array. The SC is utilized to provide sequential activation of the selected MAR by application of the bit configuration on line 64 to the Decoder 66. When the SC has counted through the sequences 000 through 111, the next sequential advance will cause SC to hold the bit configuration 1000, which will provide a disabling signal on line 68 to the Sequence Gate 70, thereby terminating the automatic memory assignment sequence.

The Decoder 66 functions when enabled by a signal received on line 72 to decode the 3-bit count received on line 64 and to provide a signal on only one of the eight output lines labeled 74-0 through 74-7, each of which are utilized to enable an associated MAR. For example, when the Decoder receives the configuration 001 from the SC, an enabling signal will be provided by the Decoder on line 74-1 for enabling MAR-1 thereby allowing the contents of MAC to be set into MAR-1. At that time, all other MAR circuits will be disabled.

The timing of the automatic memory assignment sequences under control of the Timing Device 78 which operates, when activated by a signal received on line 80, to provide a timing signal after a predetermined delay on line 82 1 to advance SC, on line 82-2 to advance MAC, and on line 82-3 to advance MCC. A timing signal is provided on line 84 to AND 86, and on line 88 back to the Sequence Gate 70 for reinitiating the sequence. The sequence will be continued until such time as the disabling signal is received on line 68 by the Sequence Gate.

The selection of Page Mode or Normal Mode is received on line 24 by the Mode Select 90. If the Normal Mode is selected, a signal on line 92 will enable the Normal Mode Multiplexer 94. Alternatively, if the Page Mode is selected, the signal on line 96 will select the Page Mode Multiplexer 98. The memory addressing system is such that in the Normal Mode the Memory Modules are referenced individually, and in the Page Mode the Memory Modules are referenced in pairs, thereby requiring that in the automatic memory assignment sequence that the Memory Modules be evaluated and assigned in pairs.

The Interlock signals I0 through I7 are received on line 28-1, and the Switch signals SW0 through SW7 are received on line 28-2. The Interlock signals are provided on line 100 to the Normal Mode Multiplexer 94, and on line 100-1 to AND circuit 102, where the Interlocks are paired for providing signals on line 104 to the Page Mode Multiplexer 98. Similarly, the Switch signals are provided on line 106 to the Normal Mode Multiplexer 94, and on line 106-1 to AND 102. The SC provides signals on line 64-1 to the Page Mode Multiplexer 98 and on line 64-2 to the Normal Mode Multiplexer 94. The output from the Page Mode Multiplexer on line 108 is provided to OR circuit 110, and the output from the Normal Mode Multiplexer is provided on line 112 to OR 110. The output from OR 110 is utilized to control the operation of AND 86, MAC 58, and MCC 56, by the signals applied on line 114, depending upon the determination of the presence or absence of the appropriate Interlock and Switch signals for the count specified by SC.

When the automatic memory assignment sequence has been completed, the Processor can proceed to access memory. The Module Address is applied on line 26 to all Compare circuits labeled 120-0 through 120-7 for the embodiment described, the Module Address will be on lines identified as 34-0 through 34-7. Any MAR set to the illegal code 1000 will provide a disable on its associated line 34. All MAR settings of permissible module addresses will provide Enable signals on their associated lines 34. In order to provide additional control or synchronization, a Timing signal from the processor can be received on line 27 for providing the enable control of the comparison.

Table I illustrates the interaction of the Decoder, the Scan Counter, the Memory Assignment Counter, the Memory Capacity Counter, and the Memory Assignment Registers.

TABLE I

| Power On - Reset Applied | |
|---|---|
| Set Scan Counter (SC) | 0000 |
| Set Memory Assignment Counter (MAC) | 0000 |
| Set Memory Capacity Counter (MCC) | 1111 |
| Set all Memory Assignment Registers (MAR) | 1000 |
| Hold condition until Reset released | |
| Clock 0 - If Memory Module 0 present | |
| Enable Decoder - Transfer MAC to MAR-0 = | 0000 |
|     Advance SC =   0001 | |
|     Advance MAC =   0001 | |
|     Advance MCC =   0000 | |
| Clock 1 - If Memory Module 1 present | |
| Enable Decoder - Transfer MAC to MAR-1 = | 0001 |
|     Advance SC =   0010 | |
|     Advance MAC =   0010 | |
|     Advance MCC =   0001 | |
| Clock 2 - If Memory Module 2 not present | |
| Disable Decoder - MAR-2 remains - 1000 (illegal) | |
|     Advance SC =   0011 | |
|     Hold MAC =   0010 | |
|     Hold MCC =   0001 | |
| Clock 3 - If Memory Module 3 present | |
| Enable Decoder - Transfer MAC to MAR-3 = | 0010 |
|     Advance SC =   0100 | |
|     Advance MAC =   0011 | |
|     Advance MCC =   0010 | |
| Clocks 4-6 Repeat | |
| Clock 7 - If Memory Module 7 present | |
| Enable Decoder - Transfer MAC to MAR-7 | |
| Advance SC =     1000 - Terminate Sequence | |
| Advance MAC =   Not used further | |
| Advance MCC =   Memory Modules - 1 available | |

It can been seen then, that all MAR are set initially to the illegal code 1000. If a Memory Module is missing, the MAR associated will remain at the illegal code 1000. This will not compare with any legal address to be accessed by the Processor and will thereby disable the associated Memory Module. Any number of Memory Modules can be missing or switched out of the system in any location. For example, if the third (MAR-2) and fifth (MAR-4) Memory Modules are absent, the MAR settings at the end of the scan would appear as shown in Table II.

TABLE II

| MAR-0 | MAR-1 | MAR-2 | MAR-3 | MAR-4 | MAR-5 | MAR-6 | MAR-7 |
|---|---|---|---|---|---|---|---|
| 0000 | 0001 | 1000 | 0010 | 1000 | 0011 | 0100 | 0101 | comprised of 3 bit positions. Each Compare circuit receives a 4-bit input from its associated MAR on lines labeled 122-0 through 122-7. Thus it can be seen that for those MAR settings having the illegal value of 1000, can never form a comparison to select the associated Memory Module. Only those MAR values set during the automatic memory assignment sequence will be within a range to permit selection of the associated Memory Module. The highest order bit position of each MAR is provided as an Enable to its associated Memory Module Thus it can be seen that there are provided sequential Memory Module addresses skipping over the missing Memory Modules.

In the Page Mode two Memory Modules are required for each assignment. To accomplish this configuration, the low-order bit of the MAC will be forced inoperative and will not be used. During the memory accessing cycle, after the memory assignment has been completed, the Memory Module addresses will be modified to eliminate the the lowest order bit from the comparison operation. Accordingly, if all Memory Modules are present, after the automatic memory assignment sequence has been completed, the contents of all MAR will appear as shown in Table III.

TABLE III

| 0000 | 0000 | 0010 | 0010 | 0100 | 0100 | 0110 | 0110 |
| --- | --- | --- | --- | --- | --- | --- | --- |

Figure 3:
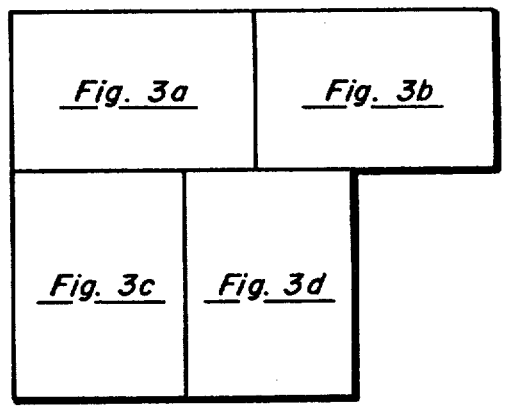
FIG. 3a through 3d, when arranged as shown in FIG. 3 is a logic diagram of the automatic memory address assignment system and memory module select system of the present invention.

FIG. 3a through FIG. 3d, when arranged as shown in FIG. 3, is a logic diagram of the Automatic Memory Assignment System and Memory Module Select System of the present invention. This circuit and logic diagram illustrates the logical interrelationship of circuits that will be described in detail, all of which are available commercially, and may be selected from differing circuits having differing power and timing requirements. The specific power and timing signals are not illustrated in detail since they would be obvious to those skilled in the art and would depend upon the specific types of circuits selected to implement the logical interrelationship shown. As illustrated, the direction of data flow and control flow is in the direction of the arrowheads. The arrowhead or arrowheads at the input of a block in combination with the arrowhead configuration at the output of the block defines the logical function of the block. A closed arrowhead normally indicates a high signal and an open arrowhead normally indicates a low signal. It is understood that inversion of the signal may or may not take place through a particular block. For example, two open arrowheads at the input of an OR circuit and a closed arrowhead at its output would indicate that the output signal will be high if either or both of the input signals are low. Alternatively, if the circuit symbol has two closed arrowheads applied to an OR circuit with an open arrowhead output, it would be interpreted that the output signal will be low if either or both of the input signals are high. When a logic element has both a closed and an open arrowhead at its output, it will provide complementary outputs with respect to each other, on each of the two output lines, dependent upon the function of the circuit and the state of the input signal or signals. Specific logic elements will be described in detail as they are encountered. Similarly, counters and registers will be described in their functional operation as they are encountered. To the extent possible, lines and circuit elements previously described will bear the same reference numerals.

The Reset signal is applied on line 22 to OR 150. The High Reset results in a High signal on line 54-4 to OR 110, which provides a Low signal on line 114 to the 9 input terminal of the Memory Assignment Counter 58 and the Memory Capacity Counter 56. This signal is also applied to AND 86. The MAC and the MCC operate such that the combination of signals on the 9 and 7 input terminals control the operation. The following signal levels described the operation of these circuits:

| PINS | | |
| --- | --- | --- |
| 9 | 7 | |
| low | low | load |
| low | high | increase |
| high | low | decrease |
| high | high | hold |

These conditions prevail as long as the Reset signal is applied to line 22. At the same time, OR 150 will provide a Low signal on line 54-3 to the control input terminal of the Scan Counter 62, thereby clearing it, and to the 7 input terminals of the Memory Assignment Counter 58 and the Memory Capacity Counter 56. It can be seen that the combination of Low input signals on the 9 and 7 input terminals of MAC and MCC results in the loading operation for each of these counters. Since MAC has no input supplied to it, it is cleared to an all zero condition. The input terminals of MCC are tied to a reference voltage that result in it being set to the all one condition. It can be seen then that the Scan Counter 62, the Memory Assignment Counter 58 and the Memory Capacity Counter have been initialized. The Low output signal from OR 150 is also provided on line 54-5 to Low OR circuits 152-0 through 152-7, each of which is coupled to the Enable input terminals of Memory Assignment Registers 50-0 through 50-7 respectively by lines 154-0 through 154-7.

Each Memory Assignment Register is a 4 bit position dual input register. The determination of whether the A input terminals or the B input terminals will be effective is determined by the combination of signals received on the Set (S) and Enable (E) control terminals. This signal combination control of S and E for each MAR circuit is determined by the following signal combination:

| S | E | MAR FUNCTIONS |
| --- | --- | --- |
| High | Low | Select A input |
| High | High | Load illegal code 1000 |
| Low | Low | Select B input, load memory count |
| Low | High | Hold |

During the initialize phase, all A input terminals of the high-ordered bit positions are tied to a High reference while all other A input terminals are left open. In order to understand the setting of the MAR circuits, attention is directed to FIG. 4, which is a timing diagram of initialization and setting for a MAR. The application of the Reset results in the E input being driven Low, and after the 5 circuit delay time results in the S input being switched High, thereby selecting the A input terminals. This condition holds during the duration of the Reset, and for 5 circuit delay times after termination of the Reset. When the Reset terminates and the time delay elapses, the S input is switched Low, thereby selecting the B input terminals. After the initialization, then, the functioning of each MAR is provided and controlled by the output signals received respectively from associated ones of the OR circuits 152-0 through 152-7. This selection will determine whether to hold the illegal condition, or to load the associated MAR with the appropriate Memory Assignment Count. Returning then to a consideration of FIG. 3, the Low signal from OR 150 is provided on line 156 to a timing chain comprised of Inverter Circuits 158-1 through 158-5, which introduces a time delay of five circuit propagation times to the effect of the Reset signal. This results in the High output signal on line 54 after the delay and is provided as disable on line 54-8 to Low AND circuit 70 (The Sequence Gate in FIG. 2a), and on line 54-6 to the Set input terminals of all MAR-0 through MAR-7 circuits. The application of this signal thereto results in Memory Assignment Registers 50-0 through 50-7 being set to the initialized condition of binary 1000. The High signal is applied from line 54 to High OR circuit 162, which provides a High signal on line 82 to the Count terminal of Scan Counter 62 on line 82-1, and to the Count input terminals of the MAC 58 and the MCC 56. This condition holdsfor initialization as long as the Reset signal is applied to line 22. When the Reset signal is removed, the conditions reverse at the output of OR 150, resulting in a Low signal on line 54-4, and High signal on lines 54-3, 54-5, which thereby transfers control of OR circuits 152-0 through 152-7 to the Decoder 66; on line 54-6 which renders the Memory Assignment Registers responsive to the input signals received on lines 60; and on line 54-8 to enable Sequence Gate AND 70.

The switches SW0 through SW7 are serially coupled through related Interlocks I0 through I7, thereby when closed coupling a reference 166 to associated lines 168-0 through 168-7. In the Page Mode, it is necessary to have adjacent Memory Modules available to perform the addressing sequences. Accordingly, adjacent pairs of Memory Modules are coupled through High AND circuits 102-1 through 102-4. Illustratively, it is necessary that MM0 and MM1 be in place thereby closing Interlocks I0 and I1, and that both associated Switches S0 and S1 be closed in order for there to be High signals on both lines 168-0 and 168-1. This condition enables High AND 102-1 and a High signal will be provided on line 104-1 to the 0 and 1 input terminals of the Page Mode Multiplexer 98. The similar operation would be required for AND circuits 102-2, 102-3, and 102-4, each of which would be paired to associated pairs of input terminals to the Page Mode Multiplexer 98 through lines 104-2, 104-3, and 104-4, respectively.

For the Normal addressing, the lines 168-0 through 168-7 are coupled to respectively situated input terminals of the Normal Mode Multiplexer 94. The operation of the Multiplexers 94 and 98, both of which are circuits available commercially, will be described in the consideration of the operational sequences.

The addressing mode selection is determined by the Mode Select signal received on line 24 by High OR circuit 170 Mode Select 90 in FIG. 2b), a High signal indicating the Page Mode, and a Low signal indicating the Normal Mode. When the Page Mode is selected, the Low signal on line 96 will enable the Page Mode Multiplexer 98, and the High signal on line 92 will disable the Normal Mode Multiplexer 94. It will be recalled from above, that in the Page Mode the lowest order bit position of the Memory Module addressing is over-ridden so that pairing occurs. This function is provided by the High signal applied on line 92-1 to High OR circuit 172. It can be seen that as long as the Page Mode is selected, the outputs from OR circuit 172 on its associated line 60 will be held at the High position indicative of the binary 0 condition.

When the Normal Mode is selected, OR circuit 170 will have the reverse conditions at its output terminals, whereby line 96 will provide a High disable signal to Page Mode Multiplexer 98. The Low signal on line 92 will enable the Normal Mode Multiplexer 94. The Low signal on line 92-1 will render OR circuit 172 responsive to the output of the Memory Assignment Counter 58.

The Page Mode Multiplexer 98 operates, when activated by the appropriate Page Mode enable signal to respond to the count received on lines 64-1 to evaluate the presence or absence of signals on the line specified by the received count. For example, if the count received is binary 000 the Multiplexer will respond to provide a High output signal on line 108 if the input signal to the 0 input terminal is present. All other input terminals will be ignored. As the count applied on line 64-1 is varied, the various input terminals specified will be evaluated to determine whether the associated Memory Module is present or not. An absent or switched off Memory Module will result in a Low signal being applied to the output line 108 to the High OR circuit 110. In a similar manner, the Normal Mode Multiplexer 94 responds to the count signals received on lines 64-2 for the selection of the corresponding input terminal evaluation. For example, if the count binary 110 is received on lines 64-2, the 6 input terminal will be evaluated, and if that Memory Module is present, it will result in the output of a High signal on line 112 to OR circuit 110. Again, if the Memory Module associated with the selected input terminal is absent, a Low output signal will be generated on line 112, and no advancement of count will occur. This follows from the condition that all of the input signals to High OR circuit 110 will be Low, thereby resulting in a High output signal on line 114, which when applied to the 9 input terminal of the MAC 58 and the MCC 56 in combination with the High signals received by the 7 input terminals will satisfy the Hold condition.

The timing of the automatic memory assignment sequence is accomplished by the Delay Line 174 and its associated Low AND circuits 70 and 86 and OR 180. (see TIMING DEVICE 78 in FIG. 2a). Delay Line 174 is of a type of circuit available commercially, and for this embodiment is selected to have a nominal 100 nanosecond delay from the time of application of a signal on input line 80-1 until the output signal appears at output terminal 178. It should be understood that the delay required for Delay Line 174 will be matched to the circuit propagation time of the specific circuits utilized to implement the system, and a longer or shorter delay may be required for other circuit types. This selection would be readily apparent to one skilled in the art. As long as the Reset pulse is present, the timing circuitry has no function. When the Reset pulse is removed, the signal on line 54-8 will be switched Low. The Scan Counter 62 has been cleared to all 0's and will be coupled such that the most significant digit will drive line 68 Low. This condition will prevail until the SC has been counted to the binary 1000 condition, at which time a High signal will be provided on line 68 thereby disabling AND circuit 70. Until a timing pulse has propagated through Delay Line 174, the output at line 178 will be Low, thereby causing OR circuit 180 to provide a Low on line 88. When all input signals to AND 70 are Low, it provides a Low output signal on line 80-2 to Low AND 86, and a High signal on line 80-1 to the input of the Delay Line. The signal from OR 110 on line 114 will be a Low signal and will enable AND 86. The output signal on line 84 from the Delay Line will be Low so that all of the input requirements for AND 86 are satisfied and a Low enabling signal will be passed on line 72 to the Decoder 66. As the signal propagates down the Delay Line, a High signal will be generated on line 84 which will momentarily disable AND 86, and will thereby disable the Decoder 66. The disabling is necessary in order to allow the Scan Counter 62 to be advanced in preparation for the next sequence. As the signal propagates through the Delay Line, a positive signal will be generated on line 176 which will satisfy the input condition of High OR circuit 162, and will cause the counters to be advanced provided the control conditions for the MAC 58 and MCC 56 are satisfied for the Memory Module being considered. The pulse propagated through the Delay Line will go High at line 178 thereby causing OR 180 to provide a High signal on line 88 which will momentarily disable AND 70. This disabled condition will continue until the pulse has terminated, at which time the signal on line 88 will again go Low and AND circuit 70 again be enabled for initiating the next timing pulse sequence.

The Scan Counter 62 provides an output count on line, 64 to the Decoder 66, which in turn selects 1 of 8 possible output lines labeled 74-0 through 74-7 indicative of the count applied. For example, at initialization the binary 000 applied on lines 64 will result in a Low output signal on lines 74-0 with High output signals on lines 74-1 through 74-7 thereby disabling OR circuits 152-1 through 152-7 while OR circuit 152-0 is enabled. At the same time, the output count from the Scan Counter 62 is provided on lines 64 as the input control signals to the Page Mode Multiplexer 98 on lines 64-1 and to the Normal Mode Multiplexer on lines 64-2. Depending upon the selected Multiplexer, if any, for the Memory Module being tested, the control signals will be applied to the MAC 58 and the MCC 56, whereby the count in each of these counters can be advanced for an available Memory Module, or held for an unavailable Memory Module. The count signal held in the MAC 58 is provided on lines 60 to all Memory Address Registers MAR-0 through MAR-7, only one of which will be enabled at any given time. In the example previously mentioned, when OR circuit 152-0 provides a Low enable signal on line 154-0 to MAR-0, the count contained in MAC will be set into MAR-0.

The sequencing thus described continues through evaluation of all Memory Module positions, for each cycle of the Delay Line 174, with the appropriate one of the MAR-0 through MAR-7 circuits being set in sequence or left in the illegal code status as originally established during setup. It will be noted that the holding condition occurs when a Memory Module is absent so that OR 110 provides a High output signal to AND 86, thereby providing a High signal on line 72 which inhibits any output from the Decoder 66 during that cycle. This effectively inhibits all OR circuits 152-0 through 152-7 such that the missing count will be skipped over and the MAR associated with that Memory Module position will be left in the illegal code storing condition. When the Scan Counter has counted through the number of cycles indicative of the number of Memory Modules in the system, and has counted one step higher, the signal on line 68 will go High and will thereafter disable AND 70 (Sequence Gate), and will signal that the automatic memory assignment sequencing has been completed.

Upon completion of the automatic memory assignment sequence, output signals will be provided from MCC on line 30 indicative that no memory is present if that be the case, and on line 32 indicative of the number of Memory Modules that are present and available to the data processing system. Thereafter, the data processing system can go into a data processing sequence, and when memory is to be accessed either for reading or writing, will provide Memory Module address signals PA0, PA1 and PA2 on lines 26 for selecting the Memory Module portion of the address. The discrete register or addressable memory location within the Memory Module does not form a part of this invention and would be accomplished by addressing separate from this circuitry. During memory accessing all access gates comprised of AND circuits 160-0 through 160-7 are enabled by the Low timing signals received on line 27. Similarly, all MAR-0 through MAR-7 circuits that are set to hold legal addresses will provide Low enabling signals on associated lines 34-0 through 34-7. Since all of the Memory Module selection circuits are essentially the same, attention will be directed to a detail discussion of the circuitry involved in the Select 1 position. Assuming that Memory Module 1 is present, the MAR-1 circuit will provide a Low signal on line 34-1 thereby further enabling selection gate AND 160-1. Assuming that Memory Module 0 is also present, the count stored in MAR-1 will be binary 0001. These signals will be provided on lines 122-1 and will be combined on a bit-by-bit basis in an Exclusive-OR arrangement with the individual bits of the module address provided on lines 26. This comparison is done by the circuitry shown enclosed in dashed block 120-1. The Exclusive-OR circuits function such that a High output signal will be generated when either signal is High, and will provide a Low output signal when both input signals are Low, or both input signals are High. The Memory Module selection digit PA0 is applied to XOR on line 26-0 and is compared to the like-ordered bit position applied on line 194-0. If the two signals compare, a Low signal is provided on line 196-0. Similarly, the PA1 signal is provided on line 26-1 to XOR 191-1 and is compared to the like-ordered signal received on line 194-1. If comparison exists, a Low signal is provided on line 196-1. Finally, the PA2 signal is provided on line 26-2 to XOR 192-1 where it is compared to a like-ordered bit received on line 194-2. If comparison is found to exist, a Low signal is provided on output line 196-2. It can be seen, then, that if all three bit positions compare, all input signals to AND 160-1 will be Low, and a Low output signal will be generated on line 38-1, thereby providing the Select 1 signal. If there is failure of comparison of any of the XOR circuits 190-1, 191-1, or 192-1, there will result in a High input signal on those lines where the bits do not compare, and in that case AND circuit 160-1 will provide a High output signal on line 38-1 thereby indicating non-selection of that Memory Module. Accordingly, it can be seen that one and only one of the selection gate circuits comprised of AND circuits 160-0 through 160-7 will be activated at any given time and all other non-selected gate circuits will be deactivated. It should be noted that in the event Memory Module 0 was not present, MAR-0 would store the illegal code 1000 and the AND circuit 160-0 would be disabled at all times. Under this condition, if Memory Module 1 is present, the addressed stores in MAR-1 would be the binary 0000 thereby indicating that it is the 0 position Memory Module when in fact it is the first available Memory Module. In order to access Memory Module 1, then, the Memory Module addressing portion of the address would be 000. It will be recalled from above, that in the Page Mode the Memory Modules are paired, and Memory Modules when accessed will be accessed in pairs. From the Table representation previously provided, it will be readily apparent that the available addressing in the Page Mode will be such that the same available address code will be stored in paired sets of the MAR-0 through MAR-7 circuits. In the Page Mode, the least significant bit of the Memory Module address being applied will be forced to 0, thereby resulting in the selection of the appropriate pair of MAR circuits. In the Page Mode, there will be Low selection signals on two of the available output selection lines 38-0 through 38-7.

Having described the detail circuit interconnections, and having traced illustrative examples, it can be seen by those skilled in the art how other examples of addressing combinations would work, and further description of examples would not tend to clarify an understanding of the inventive concepts.

Figure 5:
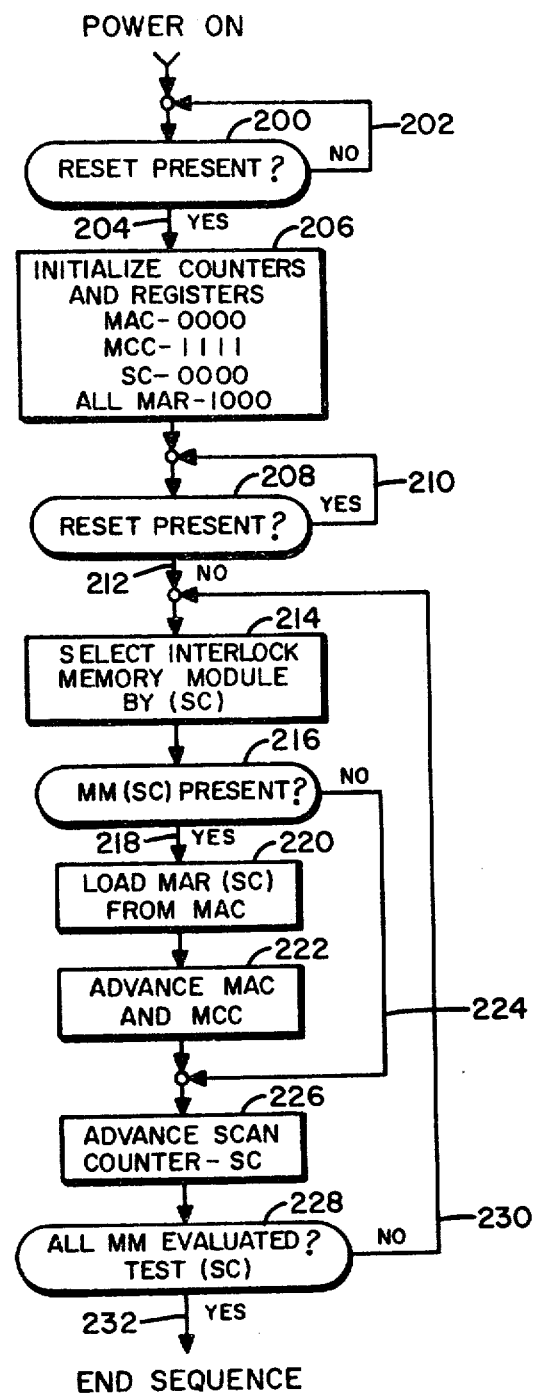
FIG. 5 is a flow diagram that illustrates the method and operation of the automatic memory address assignment system of the present invention.

FIG. 5 is a flow diagram that illustrates the method and operation of the automatic memory address assignment system of the present invention. When power is turned on, the condition of the Reset is tested as indicated by decision element 200. If the Reset is not present, the No path 202 will be taken until such time as the Reset is detected. When detected, the Yes path 204 is taken and the steps of initializing the counters and registers, as indicated by block 206, are taken. These steps involve setting the Memory Assignment Counter to initial condition of all 0's, setting the Memory Capacity Counter to an initial condition of all 1's, setting the Scan Counter to all 0's, and setting all Memory Assignment Registers to an illegal address code of 1000. It is of course apparent, that these steps and the setting of the registers and counters described will relate to a specific number of Memory Modules, and will be of a capacity to accommodate that number. When the initialization has been completed, a decision is made as to whether or not the Reset is still present, as indicated by decision element 208. In the event the Reset has not been released, the Yes path 210 is taken and the automatic memory assignment sequence is held up. When the Reset signal is no longer present, the No path 212 is taken and the first Interlock is evaluated, as indicated by block 214. A decision is made whether or not the Memory Module indicated by the Scan Counter is present, as indicated by decision element 216. If the designated Memory Module is present, the Yes path 218 is taken, and the Memory Assignment Register selected by the contents of the scan counter is loaded with the contents of the Memory Assignment Counter as indicated by block 220. The Memory Assignment Counter and the Memory Capacity Counter are each advanced by 1, as indicated by block 222. In the event the designated Memory Module is not present as determined by decision element 216, the No path 224 is taken and the designated Memory Assignment Register is left unaltered storing the initialized illegal code and neither the Memory Assignment Counter nor the Memory Capacity Counter are advanced. The Scan Counter is advanced, as indicated by block 226, and a decision is made as to whether or not all Memory Modules have been evaluated, as indicated by decision element 228. In the event that not all Memory Modules have been evaluated, as determined by testing the count of the scan counter, the No path 230 is taken and the next Memory Module Interlock and Switch combination is selected for evaluation. The sequence just described is then repeated. The steps described continue until it is determined that all Memory Modules have been evaluated, as determined by decision element 228, at which time the Yes path is taken on line 232, indicating the end of the automatic memory assignment sequence.

Figure 4:
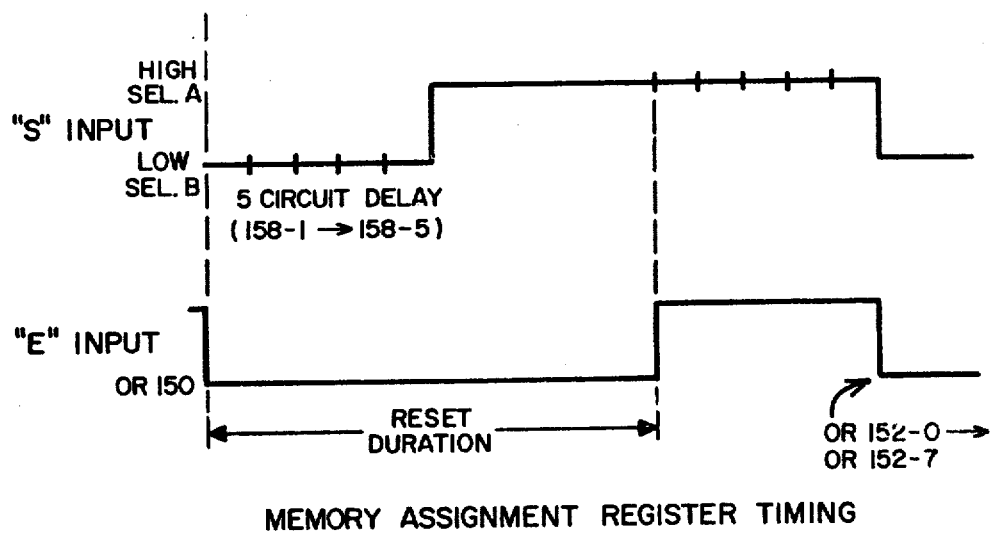
FIG. 4 is a timing diagram of initialization and setting of Memory Assignment Registers.
Figure 3A:
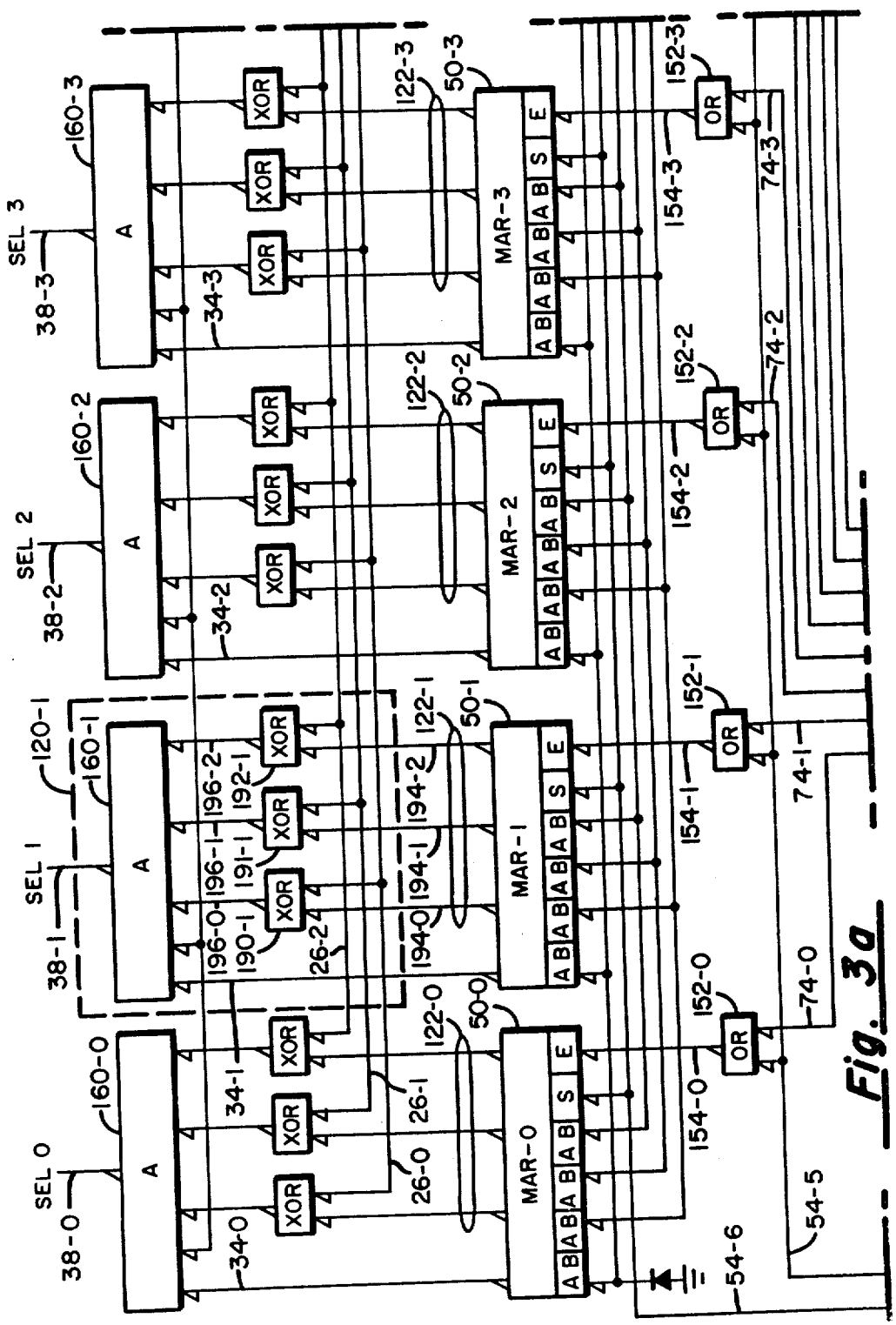
Figure 3C:
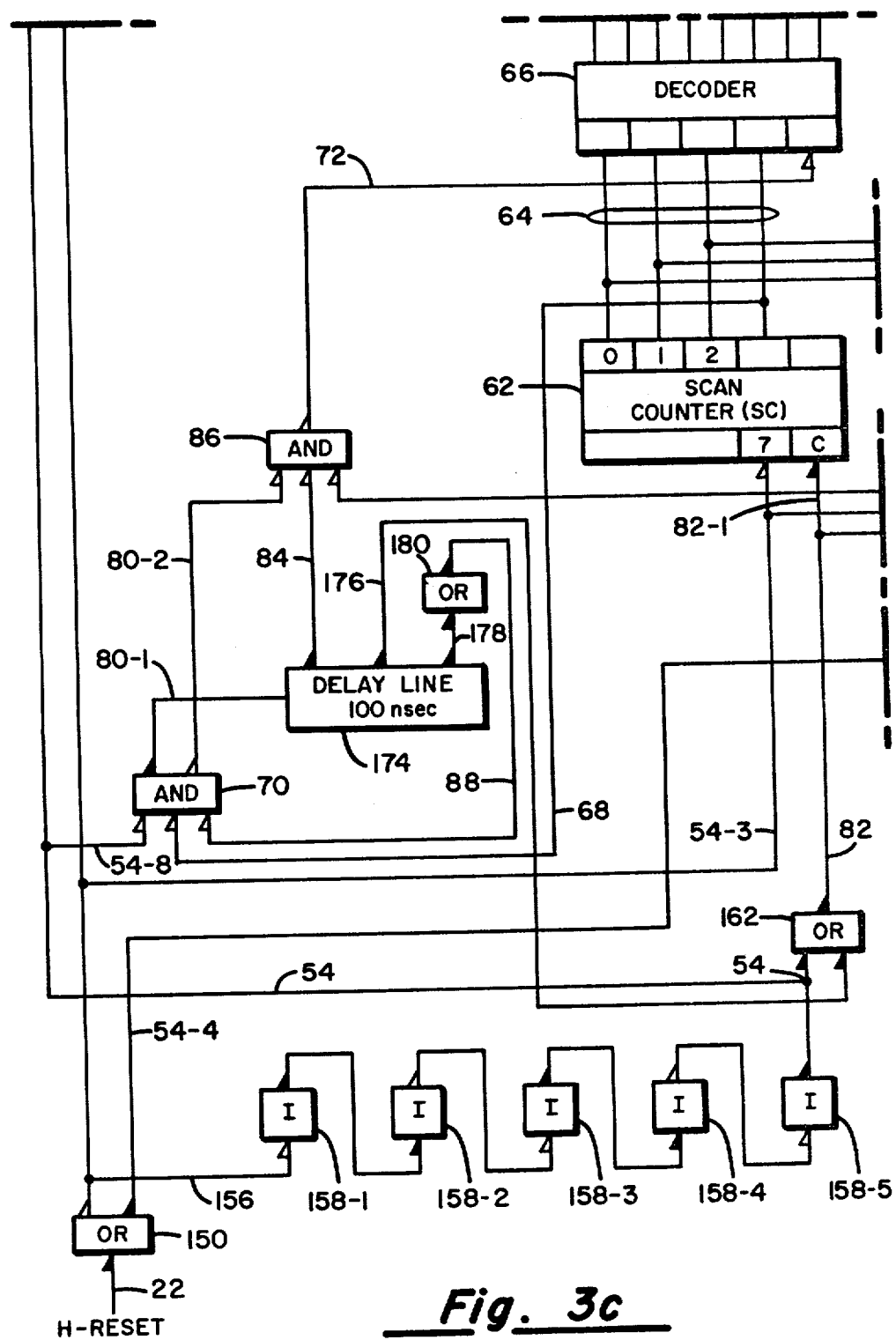
Figure 3D:
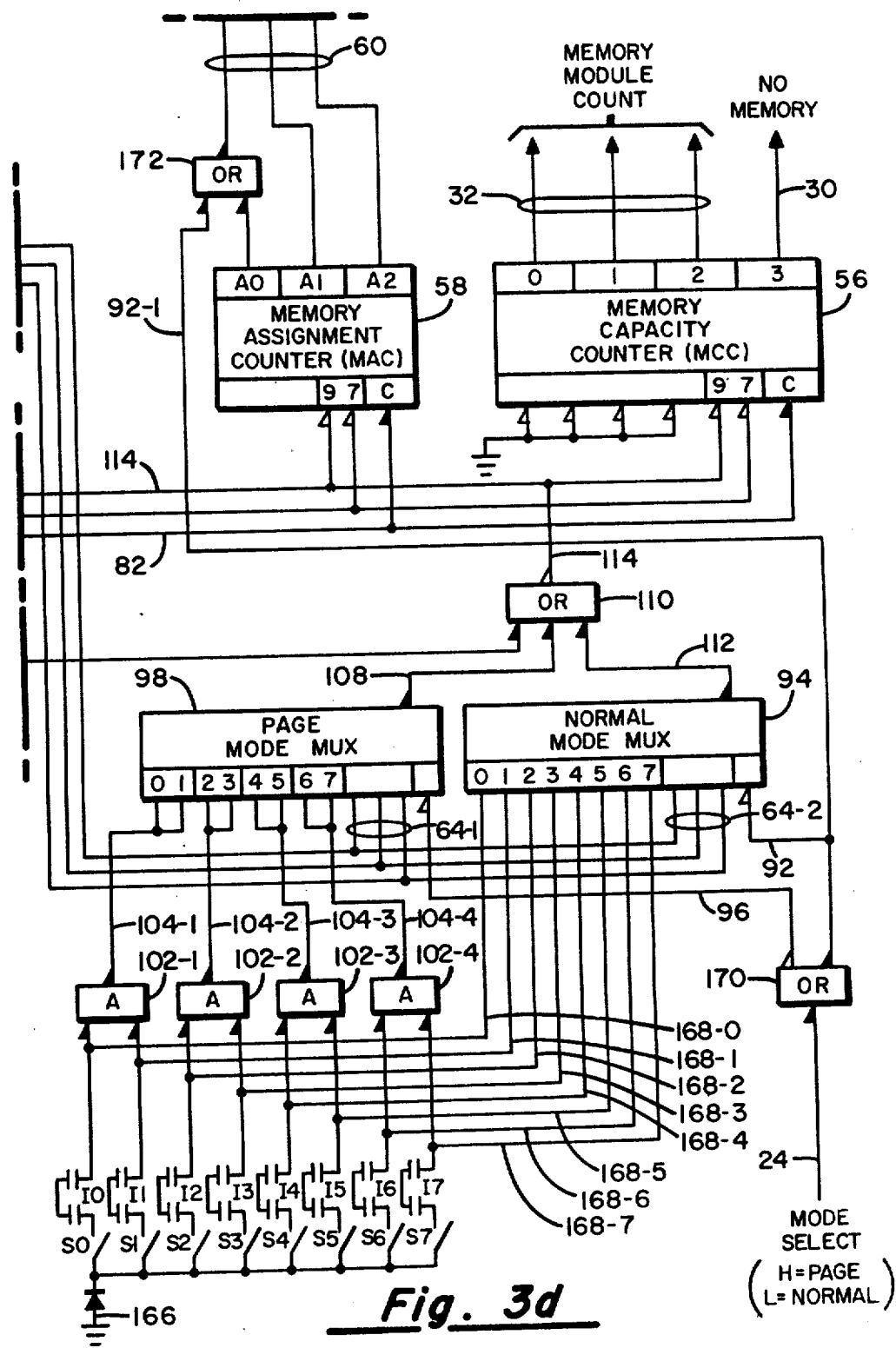

The steps of the process for the Page Mode are essentially the same as those just described and illustrated in FIG. 4, it being understood that the Memory Assignment Registers are set in pairs corresponding to the pairs of Interlock and Switch settings.

Having described the invention and the preferred embodiment and the drawings, it being understood that various modifications and alterations will be apparent to those skilled in the art without departing from the spirit and scope of the invention, what is intended to be protected by Letters Patent is set forth in the appended claims.

What is claimed is:

1. In a data processing system having a plurality of memory modules physically mounted to provide interlock signals when in the system, circuitry for providing reset signals, circuitry for providing module addresses when accessing memory, an automatic memory module address assignment system comprising:
   a plurality of memory assignment register means, each associated with a different one of the plurality of memory modules and for storing memory module addresses as they are assigned;
   set-up control means responsive to received reset signals for setting each of said plurality of memory assignment register means to store an illegal memory module address and for providing initializing signals;
   interlock scan means coupled to said set-up control means and responsive to reset signals and said initializing signals, for providing set enabling signals to respective associated ones of said plurality of memory assignment register means for memory modules found present in the system, whereby memory modules available in the system are assigned memory module addresses in a predetermined relationship and any memory module determined to be missing is effectively ignored in accessing by said illegal memory module address stored in the associated one of said plurality of memory assignment register means, said interlock scan means including—
      scan counter means coupled to said set-up control means and responsive to said initializing signals to be set to an initial condition in response thereto for providing timed scan counts for each memory module in the system; and
      memory assignment counter means responsively coupled to said set-up control means to be initialized to an initial condition in response to said initializing signals and coupled to said plurality of memory assignment register means for storing an associated memroy assignment count in enabled ones of said plurality of memory assignment register means; and
      memory capacity counter means responsively coupled to said scan counter means and to said set-up control means for being set to an initial condition in response to said initializing signals, and for determining the count of memory modules available in the system.

2. An automatic memory module address assignment system as in claim 1, wherein said interlock scan further means includes:
   decoder means coupled to said scan counter means for enabling selected ones of said plurality of memory assignment register means in response to counts stored in said scan counter means when enabled; and
   multiplexer means for receiving interlock signals and coupled to said scan counter means for selecting and evaluating interlock signals in a predetermined order and providing enable output signals to said decoder means, said memory assignment counter means, and said memory capacity counter means for each memory module found to be present in the system.

3. An automatic memory module address assignment system as in claim 2, wherein said multiplexer means includes:

mode select receiving means for receiving mode signals indicative of the addressing mode to be utilized; and first and second multiplexer circuit means responsively coupled to said mode select receiving means and to said scan counter means for alternatively setting said plurality of memory assignment register means in first or second predetermined sequences depending upon the addressing mode selected.

4. An automatic memory module address assignment system as in claim 3, and further including:

a plurality of comparison circuit means adapted for receiving memory module address signals for accessing memory, each of said comparison circuit means coupled to an associated one of said plurality of memory assignment register means for providing select signals when comparison is found between the memory module address received and the memory module address stored in ones of said memory assignment register means.

5. In a data processing system having a plurality of memory modules physically mounted to provide interlock signals when in the system, a memory assignment register associated with each memory module for storing the memory module addresses assigned to the associated memory module, a scan counter, a source of clock pulses for timing the sequences, a memory assignment counter, a decoder for sequentially activating the memory assignment registers during evaluation of the interlock signals; an automatic memory module address assignment system comprising:

means for receiving reset signals;

means for setting the scan counter to an initial condition in response to received reset signals;

means for setting the memory assignment counter to an initial condition in response to received reset signals;

means for storing illegal memory module addresses in all memory assignment register, in response to received reset signals;

means for testing the interlock status to determine the availability of each memory module specified by the scan counter, and leaving the associated memory assignment register storing said illegal memory module address if the memory module is not available;

means for setting the associated memory assignment register with the memory module address held in the memory assignment counter for the memory module found to be present;

means for advancing the memory assignment counter to indicate the next memory module address;

means for advancing the scan counter; and means for testing the scan counter to determine that all memory module interlocks have been tested and terminating the initializing sequence.

6. An automatic memory module address assignment system of claim 5, wherein the data processing system includes a memory capacity counter, and further including:

means for setting the memory capacity counter to an initial condition in response to reset signals received; and means for advancing the memory capacity counter for each memory module determined to be present in the system, said memory capacity counter providing signals indicative of the capacity of the memory system.

7. An automatic memory module address assignment system as in claim 6, wherein the data processing system is capable of alternatively addressing in a normal mode for providing access to a single memory module or the page mode for providing access to pairs of memory modules, and further including:

means for assigning discrete memory module addresses to individual memory modules available in the system in response to normal mode addressing selection signals; and means for assigning identical discrete memory module addresses to associated pairs of memory modules in response to page mode selection signals.

8. An automatic memory module address assignment system as in claim 7, and further including:

comparison means adapted for receiving memory module address signals for accessing memory, said comparison means coupled to the memory assignment registers for providing select signals when comparison is found between the memory module address received and the memory module address stored in any of the memory assignment registers.

9. In a data processing system having a plurality of memory modules physically mounted to provide interlock signals when in the system, circuitry for providing reset signals, circuitry for providing module addresses when accessing memory, an automatic memory module address assignment system in combination comprising:

a plurality of memory assignment register means, each associated with one of the plurality of memory modules and for storing memory module addresses as they are assigned;

set-up control means responsive to received reset signals for setting each of said plurality of memory assignment register means to store an illegal memory module address and for providing initializing signals;

timing means coupled to said set-up control means for providing timing signals for controlling sequential evaluation of availability of memory modules;

scan counter means coupled to said set-up control means responsive to said initializing signals to be set to an initial condition in response thereto, and responsively coupled to said timing means for advancing said scan counter for each memory module evaluation;

decoder means coupled to said scan counter means for enabling selected ones of said plurality of memory assignment register means in response to the count stored in said scan counter means when enabled;

memory assignment counter means responsively coupled to said set-up control means to be initialized to an initial condition in response to said initializing signals, and coupled to said plurality of memory assignment register means for storing said memory module addresses in enabled ones of said plurality of memory assignment register means, said memory assignment counter means being responsively coupled to said timing means for advancing said memory module addresses stored therein in response to said timing signals when enabled;

memory capacity counter means responsively coupled to said set-up control means for being set to an initial condition in response to said initializing signals, and responsively coupled to said timing for advancing the count of memory modules found to exist in the system when enabled; and mulitiplexer means for receiving interlock signals and coupled to said scan counter means for selecting and evaluating the interlock signals in a predetermined order and for providing enable output signals to said decoder means, to said memory module found to be present.

10. An automatic memory module address assignment system as in claim 9, wherein said multiplexer means includes:

mode select receiving means for receiving mode signals indicative of the addressing mode to be utilized;

first and second multiplexer means responsively coupled to said scan counter means for alternatively setting set plurality of memory assignment register means in first or second predetermined sequences depending upon the addressing mode selected.

11. An automatic memory module address assignment system as in claim 10, wherein the data processing system is capable of alternatively addressing in a normal mode for providing access to a single memory module or the page mode for providing access to pairs of memory modules, and further including:

means for assigning discrete memory module addresses to individual memory modules available in the system in response to normal mode addressing seleciton signals; and means for assigning identical discrete memory module addresses to associated pairs of memory modules in response to page mode selection signals.

12. An automatic memory module address assignment system as in claim 9, and further including:

comparison means adapted for receiving memory module address signals for accessing memory, said comparison means coupled to said plurality of memory assignment register means for providing select signals when comparison is found between the memory module address received and the memory module address stored in any of said plurality of memory assignment register means.

13. An automatic memory module address assignment system as in claim 12 wherein said comparison means includes:

a plurality of comparison circuit means adapted for receiving said memory module address signals for accessing memory, each of said comparison circuit means coupled to an associated one of said plurality of memory assignment register means for providing select signals when comparison is found between said memory module address stored in ones of said memory assignment means; and output timing means for receiving timing signals for controlling accessing of addressed memory modules after available memory modules have been assigned effective module addresses.

14. In a data processing system having a plurality of memory modules physically mounted to provide interlock signals when in the system, a memory assignment register associated with each memory module for storing the memory module address assigned to the associated memory module, a scan counter, a source of clock pulses for timing the sequences, a scan counter for counting the number of sequences, a memory assignment counter, a decoder for sequentially activating memory assignment registers during evaluation of the interlock signals, a method for automatically assigning memory module addresses to available memory modules during an initializing sequence in response to a reset signal comprising the steps of:

a. setting the scan counter to an initial condition in response to reset signals;

b. setting the memory assignment counter to an initial condition in response to reset signals;

c. storing illegal memory module addresses in all memory assignment registers in response to reset signals;

d. testing the interlock status to determine the availability of the memory module specified by the scan counter, and if that memory module is not available leaving the associated memory assignment register storing the illegal code, and proceeding to step g;

e. setting the associated memory assignment register with the memory module address held in the memory assignment counter for a memory module found to be present;

f. advancing the memory assignment counter to indicate the next memory module address;

g. advancing the scan counter;

h. testing the scan counter to determine that all memory module interlocks have been tested, and if not, returning to step d; and i. terminating the initializing sequence.

15. The method for automatically assigning memory module addresses as in claim 14, wherein the data processing system includes a memory capacity counter, including the steps of:

a. setting the memory capacity counter to an initial condition in response to reset signals; and b. advancing the memory capacity counter for each memory module determined to be present in the system, whereby signals indicative of the capacity of the memory system are provided at completion of the initializing sequence.

16. The method for automatically assigning memory module addresses to available memory modules in a data processing system capable of an alternatively addressing in the normal mode for access to single memory modules, or the page mode for access to pairs of memory modules, as in claim 15, and further including the steps of:

a. assigning discrete memory module addresses to individual memory modules available in the system in response to normal mode addressing selection signals; and b. assigning identical discrete memory module addresses to associated pairs of memory modules in response to page mode selection signals.

17. An automatic memory module address assignment system for available memory modules comprising:

memory system support means for supporting up to n memory module means in selected ones of n physical locations and for providing electrical intercommunication thereto;

not more than n memory module means supported by said memory system support means in selected ones of said n physical locations;

n interlock means, each associated with a different one of said n physical location for providing interlock signals indication of the presence or absence of the associate one of said n memory module means at the associated one of said n physical location;

reset receiving means for receiving reset signals for initiating address assignments for available ones of said n memory module means;

n memory assignment register means, each associated with a different one of said n memory module means and for storing memory module addresses as they are assigned;

set-up control means coupled to said reset receiving means for setting each of said n memory assignment register means to store are illegal memory module address and for providing initializing signals in response to said reset signals;

interlock scan means coupled to said set-up control means and said n interlock means for providing set signals to respective associated ones of said memory assignment register means for ones of said n memory module means found present in the system as determined by said interlock signals in response to said reset signals and said initializing signals, said interlock scan means including scan counter means coupled to said set-up control means and responsive to said initializing signals to be set to a first initial condition in response thereto and for providing timed scan counts for each of said n memory module means; and memory assignment counter means coupled to said interlock scan means and coupled to said set-up control means and responsive to said initializing signals to be set to a second initial condition in response thereto, and coupled to said n memory assignment register means for generating and for storing sequential memory module addresses to be assigned in a predetermined order by storing individual ones of said memory module addresses in ones of said n memory assignment register means enabled by said set signals received from said interlock scan means; and memory capacity counter means responsively coupled to said set-up control means for being set to a third initial condition in response to said initializing signals, and coupled to said scan counter means and said interlock receiving means for providing the count of said n memory module means available in the system;

whereby ones of said n memory module means available in system are assigned memory module addresses in a predetermined relationship irrespective of ones of said n memory module means that might be missing and ones of said n physical locations not having an available one of said n memory module means associated therewith are ignored in accessing due to said illegal memory module addresses stored in the associated ones of said n memory assignment register means.

* * * * *

UNITED STATES PATENT AND TRADEMARK OFFICE
CERTIFICATE OF CORRECTION

PATENT NO. : 4,468,729
DATED : August 28, 1984
INVENTOR(S) : Albert H. Schwartz

It is certified that error appears in the above-identified patent and that said Letters Patent are hereby corrected as shown below:

Column 19, Line 1, after "timing" insert -- means --.

Column 19, Line 8, after "memory" insert -- assignment counter means, and to said memory capacity counter means for each memory --.

Column 17, Line 42, "register," should be -- registers, --.

Signed and Sealed this

Twenty-sixth Day of March 1985

[SEAL]

Attest:

DONALD J. QUIGG

Attesting Officer    Acting Commissioner of Patents and Trademarks